US009690619B2

(12) United States Patent
Yamauchi et al.

(10) Patent No.: US 9,690,619 B2
(45) Date of Patent: Jun. 27, 2017

(54) THREAD PROCESSING METHOD AND THREAD PROCESSING SYSTEM FOR SETTING FOR EACH THREAD PRIORITY LEVEL OF ACCESS RIGHT TO ACCESS SHARED MEMORY (71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 14/057,814

(22) Filed: Oct. 18, 2013

(65) Prior Publication Data
US 2014/0053162 A1 Feb. 20, 2014

Related U.S. Application Data (63) Continuation of application No. PCT/JP2011/059571, filed on Apr. 18, 2011.

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/5016* (2013.01); *G06F 9/522* (2013.01); *G06F 2209/5021* (2013.01)

(58) Field of Classification Search
None
See application file for complete search history.

(56) References Cited

U.S. PATENT DOCUMENTS 4,207,687 A * 6/1980 Haas ................... G06F 17/5009
434/49
4,400,771 A * 8/1983 Suzuki ................... G06F 13/18
711/151
(Continued)

FOREIGN PATENT DOCUMENTS

JP 4-260962 9/1992
JP 6-19785 1/1994
(Continued)

OTHER PUBLICATIONS

International Preliminary Report on Patentability issued Oct. 31, 2013 in corresponding International Patent Application No. PCT/JP2011/059571.
(Continued)

*Primary Examiner* — Wissam Rashid
(74) *Attorney, Agent, or Firm* — Staas & Halsey LLP (57) ABSTRACT A thread processing method is executed by a specific apparatus included among a plurality of apparatuses, and includes assigning one thread among a plurality of threads to the apparatuses, respectively; acquiring first time information that indicates a time at which the specific apparatus receives an execution result of a corresponding thread from each of the apparatuses; and setting a priority level of an access right to access shared memory that is shared by the apparatuses and the specific apparatus, the setting being based on the first time information and second time information that indicates a time at which reception of execution results of the threads from the apparatuses ends.

6 Claims, 10 Drawing Sheets (51) Int. Cl.
*G06F 9/50* (2006.01)
*G06F 9/52* (2006.01)

(56) References Cited

U.S. PATENT DOCUMENTS

| | | | |
|---|---|---|---|
| 5,278,975 A | | 1/1994 | Ishihata et al. |
| 5,469,560 A | * | 11/1995 | Beglin ............... G06F 3/0601 |
| | | | 707/999.001 |
| 5,522,045 A | | 5/1996 | Sandberg |
| 7,487,317 B1 | * | 2/2009 | Fedorova ............ G06F 9/4881 |
| | | | 711/118 |
| 7,490,327 B1 | * | 2/2009 | Branda ............... G06F 9/4818 |
| | | | 707/999.002 |
| 2005/0068913 A1 | | 3/2005 | Tan et al. |
| 2006/0075197 A1 | * | 4/2006 | Shimada ............. G06F 13/1663 |
| | | | 711/150 |

FOREIGN PATENT DOCUMENTS

| | | |
|---|---|---|
| JP | 9-44366 | 2/1997 |
| JP | 2005-4474 | 1/2005 |
| JP | 2005-94776 | 4/2005 |
| JP | 2006-65453 | 3/2006 |
| JP | 2010-79504 | 4/2010 |

OTHER PUBLICATIONS

International Search Report mailed Jul. 26, 2011 in corresponding International Application No. PCT/JP2011/059571.

* cited by examiner

THREAD PROCESSING METHOD AND THREAD PROCESSING SYSTEM FOR SETTING FOR EACH THREAD PRIORITY LEVEL OF ACCESS RIGHT TO ACCESS SHARED MEMORY

CROSS REFERENCE TO RELATED APPLICATIONS

This application is a continuation application of International Application PCT/JP2011/059571, filed on Apr. 18, 2011 and designating the U.S., the entire contents of which are incorporated herein by reference.

FIELD

The embodiment discussed herein is related to thread processing method of performing distributed processing and a thread processing system.

BACKGROUND

Virtual distributed shared memory that retains data that is divided and distributed among the actual memory of terminal apparatuses has been disclosed as a technique for sharing data among plural terminal apparatuses. The virtual distributed shared memory is used for example in grid computing that provides, as a single composite computer system, devices on a wide area network such as Internet.

Virtual distributed shared memory is characterized in that access is distributed, enabling network load to be reduced. Virtual distributed shared memory also allows application software (hereinafter, referred to as "app") running on the terminal apparatuses to access the virtual distributed shared memory as a single continuous memory without being conscious of the virtual distributed shared memory. An app running on the terminal apparatuses assigns a thread to each of the terminal apparatuses to execute distributed processing and parallel processing. A program is executed in units of treads.

Disclosed as a technique relating to the virtual distributed shared memory is for example a technique that uses, as the virtual distributed shared memory, the memory of devices connected via a wired wide area network. Also disclosed as a wireless network example is a technique of virtualizing a send/receive buffer to relay data so that data can be communicated among terminal apparatuses that are not directly connected (see, for example, Japanese Laid-Open Patent Publication Nos. H6-19785 and 2005-94776).

In an information storage system using virtual distributed shared memory, information created by the user is stored as information elements with meaning. A technique is disclosed that, when an information acquisition request is issued from the terminal apparatuses, determines a master terminal apparatus to dynamically process the information acquisition request, for efficient exchange and duplication of information corresponding to the information acquisition request (see, for example, Japanese Laid-Open Patent Publication No. 2005-4474).

When executing plural distributed processing and parallel processing in the above conventional techniques, plural terminal apparatuses may execute the processing while performing synchronous processing. Synchronous processing is processing that interrupts processing for plural threads at a specified code position and continues the subsequent processes when all threads reach the specified code position. Terminal apparatuses executing interrupted threads wait for the synchronization. At this time, if the terminal apparatuses having threads assigned thereto have different performances or communication speeds, terminal apparatuses having higher performances or communication speeds have to wait for the synchronization for a longer period of time, resulting in drops in the overall performance of the system.

SUMMARY

According to an aspect of an embodiment, a thread processing method is executed by a specific apparatus included among a plurality of apparatuses, and includes assigning one thread among a plurality of threads to the apparatuses, respectively; acquiring first time information that indicates a time at which the specific apparatus receives an execution result of a corresponding thread from each of the apparatuses; and setting a priority level of an access right to access shared memory that is shared by the apparatuses and the specific apparatus, the setting being based on the first time information and second time information that indicates a time at which reception of execution results of the threads from the apparatuses ends.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a thread processing method and a thread processing system will be described in detail with reference to the accompanying drawings.

Figure 1:
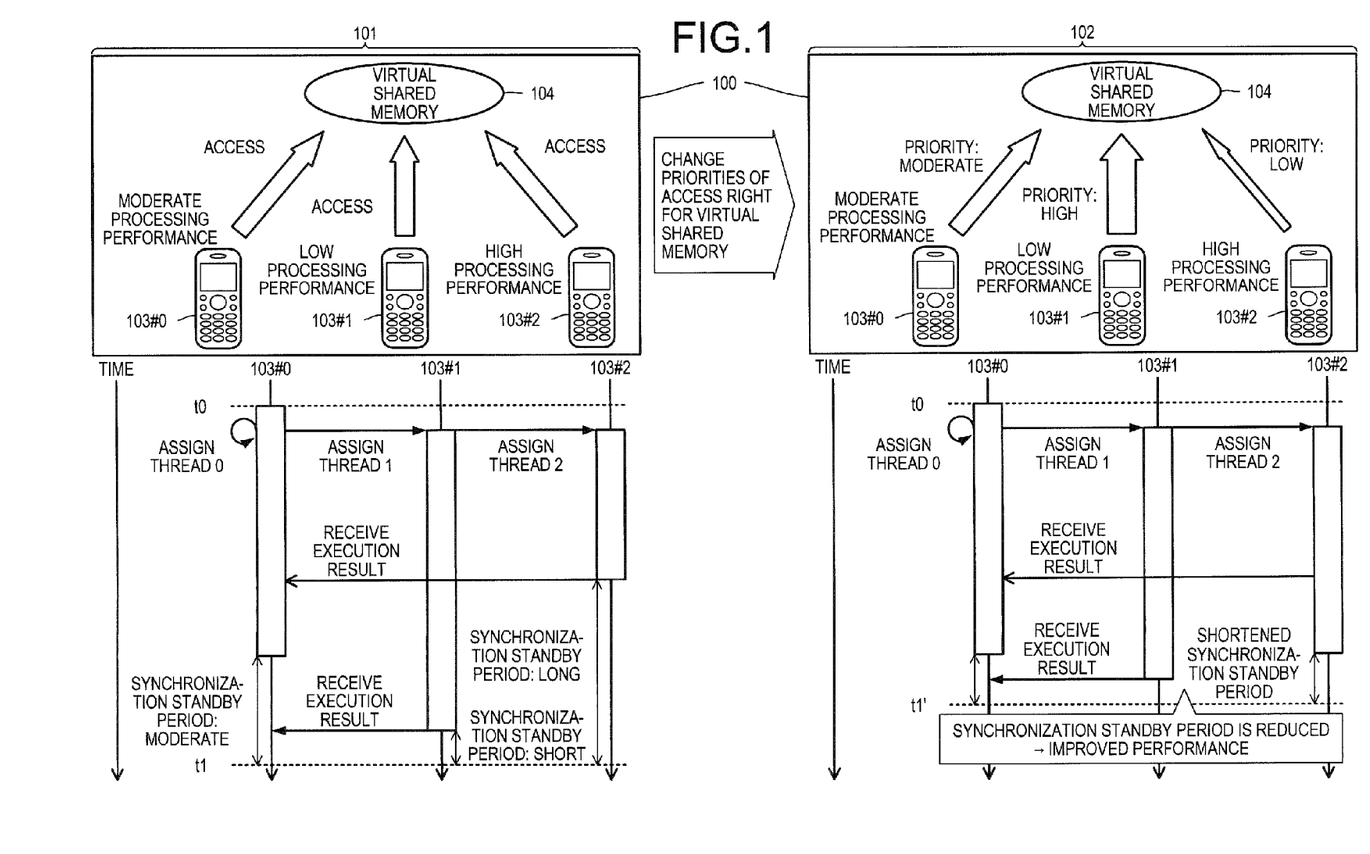
FIG. 1 is an explanatory view of an operation example of a thread processing system 100.

FIG. 1 is an explanatory view of an operation example of a thread processing system 100. A portion denoted by reference numeral 101 depicts an operation example of the thread processing system 100 in which no priority set for access rights to shared memory. A portion denoted by reference numeral 102 depicts an operation example of the thread processing system 100 in which priority is set for access rights to the shared memory has priority.

The thread processing system 100 includes plural terminal apparatuses 103 such as mobile phones or mobile terminals. For example, the thread processing system 100 depicted in FIG. 1 includes terminal apparatuses 103#0 to 103#2. Hereinafter, a reference numeral with a postfix symbol "#n" represents a reference numeral corresponding to an n-th terminal apparatus 103. The terminal apparatuses 103#0 to 103#2 are connected via radio communication such as a wireless local area network (LAN) or Bluetooth (registered trademark). The terminal apparatuses 103#0 to 103#2 can access virtual shared memory 104. The terminal apparatuses 103#0 to 103#2 access the virtual shared memory 104 to synchronize and execute plural threads. The virtual shared memory 104 is stored at a portion of storage areas of the terminal apparatuses 103#0 to 103#2.

Here, the terminal apparatus 103#0 is assumed to be a master terminal apparatus that provides overall control of the thread processing system 100 and the terminal apparatuses 103#1 and 103#2 are assumed to be slave terminal apparatuses controlled by the master terminal apparatus. Further, the terminal apparatus 103#2 is assumed to have high processing performance; the terminal apparatus 103#1 is assumed to have low processing performance; and the terminal apparatus 103#0 is assumed to have performance that is moderate and between the performance of the terminal apparatuses 103#1 and 103#2.

In this state, in the explanatory diagram denoted by reference numeral 101, the terminal apparatus 103#0 assigns threads 1 and 2 to the terminal apparatuses 103#1 and 103#2, respectively, from time t0 onward. The terminal apparatuses 103#1 and 103#2 execute the assigned threads. The terminal apparatus 103#0 assigns a thread 0 to itself, for execution. The terminal apparatuses 103#0 to 103#2 stand by until time t1 when all the threads 0 to 2 are completed, in order to establish synchronization among the terminal apparatuses.

The high processing performance terminal apparatus 103#2 quickly completes the thread 2, notifies the terminal apparatus 103#0 of the result of execution, and enters a synchronization-standby mode. After the notification from the terminal apparatus 103#2, the terminal apparatus 103#0 receives the execution result for the thread 2. Subsequently, the moderate processing performance terminal apparatus 103#0 completes the thread 0. Finally, the low-processing performance terminal apparatus 103#1 completes the thread 1 and notifies the terminal apparatus 103#0 of the result of execution. After the notification from the terminal apparatus 103#1, the terminal apparatus 103#0 receives the execution result for the thread 1.

As a result, overall performance of the thread processing system 100 denoted by reference numeral 101 drops due to the long synchronization standby period of the terminal apparatus 103#2, caused by the terminal apparatus 103#1 as a bottleneck. The terminal apparatus 103#1 has a short synchronization standby period and the terminal apparatus 103#0 has a moderate synchronization standby period that is between those of the terminal apparatuses 103#1 and 103#2.

The portion denoted by reference numeral 102 depicts the terminal apparatuses 103#0 to 103#2 for which the priority of access rights to the virtual shared memory 104 has been set. For example, in the thread processing system 100 denoted by reference numeral 101, the priority of the terminal apparatus 103#1 that gives delayed notification of the execution result is set to "high"; the priority of the terminal apparatus 103#0 having a moderate execution end time is set to "moderate"; and the priority of the terminal apparatus 103#2 that quickly gives notification of the execution result is set to "low".

By setting such priorities for the access rights, for example, when the terminal apparatuses 103#1 and 103#2 simultaneously access the virtual shared memory 104, the terminal apparatus 103#1 is allowed to preferentially access the virtual shared memory 104. This enables the terminal apparatus 103#1 denoted by reference numeral 102 to complete the thread 1 sooner than the terminal apparatus 103#1 depicted in the portion denoted by reference numeral 101. Consequent to a quicker completion of the thread, the synchronization-wait end time changes from t1 to t1', whereby the synchronization standby period of the terminal apparatuses 103#0 and 103#2 is shortened, contributing to improved performance of the thread processing system 100.

Figure 2:
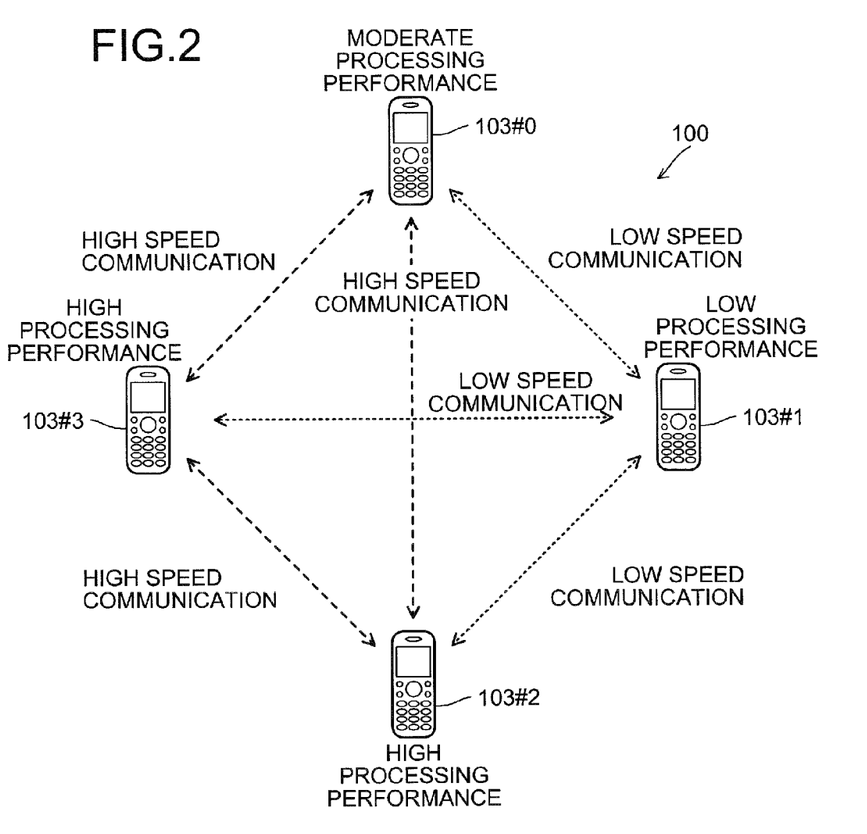
FIG. 2 is an explanatory diagram of an example of connections in the thread processing system 100.

FIG. 2 is an explanatory diagram of an example of connections in the thread processing system 100. The thread processing system 100 depicted in FIG. 2 includes a terminal apparatus 103#3 in addition to the terminal apparatuses 103#0 to 103#2 depicted in FIG. 1. It is assumed that the processing performance of the terminal apparatus 103#3 is equal to that of the terminal apparatus 103#2.

The terminal apparatuses 103#0 to 103#3 are connected to by radio communication. High speed communication such as a radio LAN connects the terminal apparatuses 103#0 and 103#2, the terminal apparatuses 103#0 and 103#3, and the terminal apparatuses 103#2 and 103#3. Low speed communication such as Bluetooth (a registered trademark) connects the terminal apparatuses 103#0 and 103#1, between those 103#1 and 103#2, and the terminal apparatuses 103#1 and 103#3.

Figure 3:
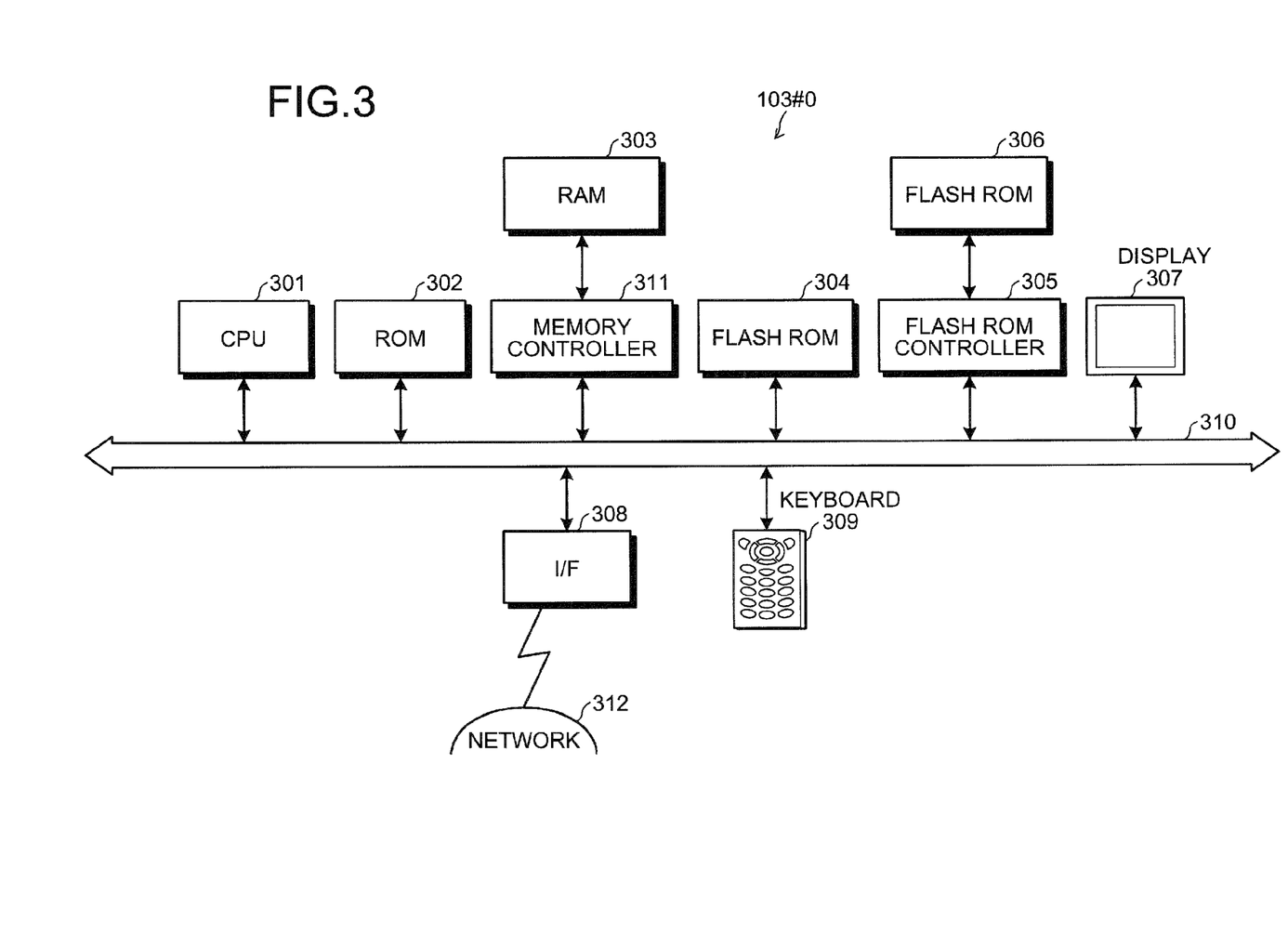
FIG. 3 is a block diagram of hardware of a terminal apparatus 103#0 according to an embodiment.

FIG. 3 is a block diagram of hardware of the terminal apparatus 103#0 according to the embodiment. The terminal apparatuses 103#1 to 103#3 have processing performance that differs from that of the terminal apparatus 103#0 but respectively have the same hardware as that of the terminal apparatus 103#0 and therefore, will not again be described. The hardware appearing in the description made with reference to FIG. 3 is completely included in the terminal apparatus 103#0 and therefore, the postfix symbol "#0" will not be attached for simplification of the description.

FIG. 3 is a block diagram of a hardware configuration of the terminal apparatus 103#0 according to the embodiment. As depicted in FIG. 3, the terminal apparatus 103#0 includes a central processing unit (CPU) 301, read-only memory (ROM) 302, random access memory (RAM) 303, a memory controller 311, flash ROM 304, a flash ROM controller 305, and flash ROM 306. The terminal apparatus 103#0 includes a display 307, an interface (I/F) 308, and a keyboard 309, as input/output devices for the user and other devices. The components of the multi-core system 300 are respectively connected by a bus 310.

The CPU 301 governs overall control of the terminal apparatus 103#0. The CPU 301 may have dedicated cache memory. The terminal apparatus 103 may be a multi-core processor system that includes multiple cores. A multi-core processor system is a computer system that includes a processor equipped with multiple cores. The multiple cores may be provided as a single processor equipped with multiple cores or a group of single-core processors connected in parallel.

The ROM 302 stores therein programs such as a boot program. The RAM 303 is used as a work area of the CPU 301. The RAM 303 and the bus 310 are connected by the memory controller 311. The memory controller 311 controls the access of the RAM 303 by the CPU 301. Further, the memory controller 311 may control access to the ROM 302, the flash ROM 304, etc. in addition to the RAM 303.

The flash ROM 304 enables high speed reading, such as NOR type flash ROM. The flash ROM 304 stores system software such as an operating system (OS), and application software. For example, when the OS is updated, the terminal apparatus 103#0 receives a new OS via the I/F 308 and updates the old OS that is stored in the flash ROM 304 with the received new OS.

The flash ROM controller 305, under the control of the CPU 301, controls the reading and writing of data with respect to the flash ROM 306. The flash ROM 306 is flash ROM that stores data, has a primary purpose of portability, and may be, for example, NAND type flash ROM. The flash ROM 306 stores therein data written under control of the flash ROM controller 305. Examples of the data include image data and video data acquired by the user of the terminal apparatus 103#0 through the I/F 308, as well as a program that executes the thread processing method according to the present embodiment. A memory card, SD card and the like may be adopted as the flash ROM 306.

The display 307 displays, for example, data such as text, images, functional information, etc., in addition to a cursor, icons, and/or tool boxes. A thin-film-transistor (TFT) liquid crystal display and the like may be employed as the display 307.

The I/F 308 is connected to a network 312 such as a local area network (LAN), a wide area network (WAN), and the Internet through a communication line and is connected to other apparatuses through the network 312. The I/F 308 administers an internal interface with the network 312 and controls the input and output of data with respect to external apparatuses. For example, a modem or a LAN adaptor may be employed as the I/F 308.

The keyboard 309 includes, for example, keys for inputting letters, numerals, and various instructions and performs the input of data. Alternatively, a touch-panel-type input pad or numeric keypad, etc. may be adopted.

Figure 4:
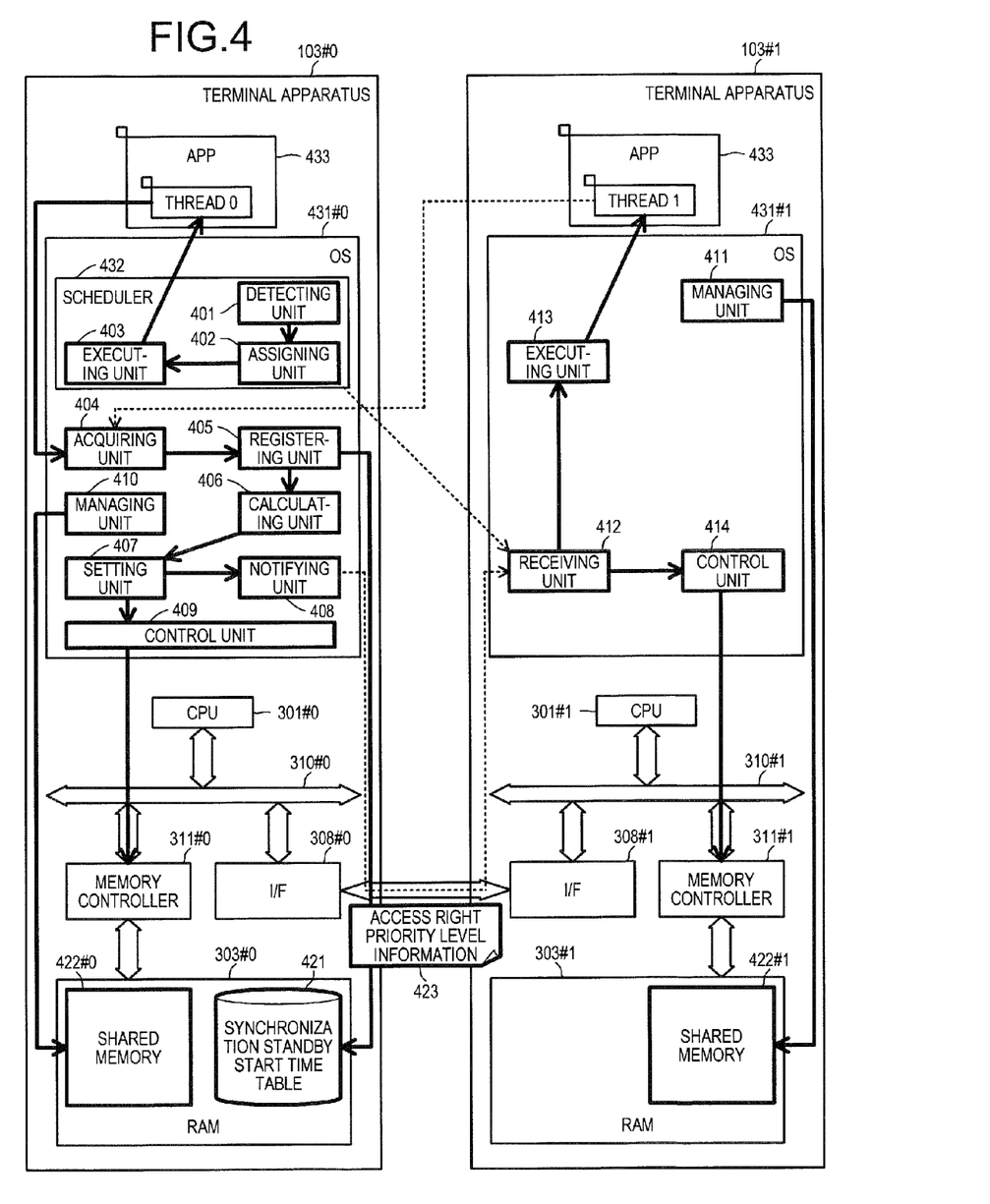
FIG. 4 is a functional diagram of the thread processing system 100.

Examples of functions of the thread processing system 100 will be described. FIG. 4 is a functional diagram of the thread processing system 100. The thread processing system 100 includes a detecting unit 401, an assigning unit 402, an executing unit 403, an acquiring unit 404, a registering unit 405, a calculating unit 406, a setting unit 407, a notifying unit 408, a control unit 409, and a managing unit 410, and also includes a managing unit 411, a receiving unit 412, an executing unit 413, and a control unit 414.

Functions forming a control unit (the detecting unit 401 to the control unit 414) are implemented by causing the CPUs 301#0 and 301#1 to execute programs stored in a storage device. The storage device is, for example, the ROM 302, the RAM 303, or the flash ROM 304 or 306.

The thread processing system 100 can access a synchronization standby start time table 421 and shared memory 422 and produces access right priority level information 423. The CPU 301#0 executes an OS 431#0 and a scheduler 432. The CPU 301#1 executes an OS 431#1. The thread processing system 100 currently executes an app 433. A thread 0 in the app 433 is assigned to the CPU 301#0 and a thread 1 is assigned to the CPU 301#1.

The units from the detecting unit 401 to the managing unit 410 are functions of the terminal apparatus 103#0, which is the master terminal apparatus. The units from the managing unit 411 to the control unit 414 are functions of the terminal apparatus 103#1, which is a slave terminal apparatus. When the terminal apparatus 103#1 acts as the master terminal apparatus, the terminal apparatus 103#1 includes the units from the detecting unit 401 to the managing unit 410. When the terminal apparatus 103#0 acts as the slave terminal apparatus, the terminal apparatus 103#0 includes the units from the managing unit 411 to the control unit 414. The units from the detecting unit 401 to the executing unit 403 are included among the functions of the scheduler 432. The units from the acquiring unit 404 to the control unit 409 may be included among the functions of the scheduler 432.

The OS 431 is a program to control the terminal apparatuses 103. For example, the OS 431#0 controls the terminal apparatus 103#0 and the OS 431#1 controls the terminal apparatus 103#1. For example, the OS 431 provides a library used by the app 433. The OS 431 includes a device driver that controls the flash ROM controller 305, the I/F 308, the keyboard 309, etc.

The scheduler 432 is a program that determines the order in which threads in the app currently executed by the thread processing system 100 are assigned to the CPUs 301. It is assumed that the scheduler 432 according to this embodiment includes a dispatch function to assign to the CPUs 301, the thread whose assignment is determined to be executed next. For example, the scheduler 432 assigns the thread 0 to the CPU 301#0 and the thread 1 to the CPU 301#1.

The synchronization standby start time table 421 is a table that stores first time information that indicates the time at which the execution result of each of the threads is received from a corresponding apparatus. The contents of the synchronization standby start time table 421 will be described later with reference to FIG. 5. The synchronization standby start time table 421 is stored in a RAM 303#0 of the terminal apparatus 103#0 that is the master terminal apparatus.

The shared memory 422 is real memory as opposed to the virtual shared memory 104. Shared memories 422#0 and 422#1, and the shared memory 422 in another terminal apparatus 103 are combined to form the virtual shared memory 104. The shared memory 422#0 is present in the RAM 303#0 and the shared memory 422#1 is present in a RAM 303#1.

The access right priority level information 423 is information that indicates priority levels of access rights to access the virtual shared memory 104 of each of the plural apparatuses to be the slave terminal apparatus, for a specific apparatus to be the master terminal apparatus. An example of production of the access right priority level information 423 will be described later with reference to FIG. 6.

The detecting unit 401 has a function of detecting the occurrence of an assignment request for a new thread. For example, the detecting unit 401 detects the occurrence of an assignment request for a new thread in the currently executed app 433. According to a specific detection method, when an execution code of the currently executed app 433 invokes an API that executes the new thread, the detecting unit 401 detects the occurrence of the assignment request for the new thread. The detected assignment request is stored to a storage area such as the register, the cache memory, or the RAM 303 of the CPU 301#0.

The assigning unit 402 has a function of assigning one of the plural threads to each of the plural apparatuses that are the slave terminal apparatuses in the specific apparatus to be the master terminal apparatus.

The assigning unit 402 may assign the thread to the master terminal apparatus. For example, the assigning unit 402 assigns the thread 0 to the CPU 301#0 and the thread 1 to the CPU 301#1. When the assigning unit 402 assigns the thread to the apparatuses other than the apparatus of the assigning unit 402, the assigning unit 402 notifies the apparatus performing the thread assignment of the assignment request. Information indicating that the thread is assigned may be stored to the storage area such as the register, the cache memory, or the RAM 303 of the CPU 301#0.

The executing units 403 and 413 each have a function of executing a thread assigned thereto. For example, the executing unit 403 executes the thread 0 and the executing unit 413 executes the thread 1. The execution results of the threads are stored to a storage area such as the register, the cache memory, or the RAM 303 of the CPU 301#0.

The acquiring unit 404 has a function of acquiring the first time information that indicates the time at which the execution result of each of the threads is received from each of the plural apparatuses. For example, it is assumed that the time at which the execution of the thread 0 is started as zero [msec] and the time at which the execution thereof comes to an end as 110 [msec]. In this case, the acquiring unit 404 acquires 110 [msec] as a synchronization standby start time, which is the time at which the execution result of the thread 0 is received indicated by the first time information. The acquired synchronization standby start time is stored to a storage area such as the register, the cache memory, or the RAM 303 of the CPU 301#0.

The registering unit 405 has a function of registering the first time information that indicates the time at which the execution result of each of the threads is received from each of the plural apparatuses. For example, the registering unit 405 registers "110 [msec]" that is the synchronization standby start time of the thread 0, into the synchronization standby start time table 421.

The calculating unit 406 calculates a predetermined time period for each of the plural apparatuses based on the first time information and second time information that indicates the time at which the reception of the execution results of the plural threads from the plural apparatuses comes to an end. In this case, the "predetermined time period" is the synchronization standby period from the time at which the execution result is received from a given apparatus until the time at which the execution results are received from all the threads.

For example, it is assumed that the synchronization standby start time for the thread 0 is 110 [msec] and the synchronization standby start time for the thread 1 is 190 [msec] and that the time at which the execution result of the thread 1 is received is the time at which the reception of the execution results of all the threads comes to an end. In this case, the calculating unit 406 calculates the synchronization standby period of the terminal apparatus 103#0 to be 190−110=80 [msec] and the synchronization standby period of the terminal apparatus 103#1 to be 190−190=0 [msec]. The calculated synchronization standby periods are stored to the storage area such as the register, the cache memory, or the RAM 303 of the CPU 301#0.

The setting unit 407 has a function of setting the priority level of the access right to access the shared memory 422 shared among the specific apparatus and the plural apparatuses based on the first time information and the second time information of each of the plural apparatuses. The priority level of the access right to access the shared memory 422 is equal to that of the access right to access the virtual shared memory 104 combined with the shared memory 422. Therefore, hereinafter, the description will be made using the "priority level of the access right to access the virtual shared memory 104" for standardization.

For example, it is assumed that the first time information of the terminal apparatus 103#0 is 110 [msec], that of the terminal apparatus 103#1 is 190 [msec], and the second time information thereof is 190 [msec]. For example, the setting unit 407 sets the priority levels of the access rights in descending order of the time indicated by the first time information. In this example, the setting unit 407 sets the priority level of the terminal apparatus 103#0 to be low and that of the terminal apparatus 103#1 to be high.

The setting unit 407 may set the priority level of the access right based on the predetermined time period calculated by the calculating unit 406. For example, concerning the synchronization standby period, which is a predetermined time period, it is assumed that the synchronization standby period of the terminal apparatus 103#0 is 80 [msec] and that of the terminal apparatus 103#1 is zero [msec]. In this case, the setting unit 407 sets the priority levels of the access rights in ascending order of the length of the synchronization standby period. In this example, the setting unit 407 also sets the priority level of the terminal apparatus 103#0 to be low and that of the terminal apparatus 103#1 to be high. The set priority levels are produced as the access right priority level information 423. The access right priority level information 423 is stored to a storage area such as the register, the cache memory, or the RAM 303 of the CPU 301#0.

The notifying unit 408 has a function of notifying the plural apparatuses of information concerning the priority level of the access right. For example, the notifying unit 408 notifies the terminal apparatus 103#1 of the access right priority level information 423 produced by the setting unit 407.

The control unit 409 has a function of controlling the memory controller 311 that controls the access to the shared memory 422, according to the priority level of the access right. For example, it is assumed that the setting unit 407 sets the priority level of the terminal apparatus 103#0 to be low and that of the terminal apparatus 103#1 to be high.

In this case, when an access request is issued through the I/F 308#0 during access of the shared memory 422#0 by the CPU 301#0, the control unit 409 controls the memory controller 311#0 to suspend the access from the CPU 301#0. After the suspension, the control unit 409 accesses the shared memory 422#0 through the I/F 308#0. For example, the control unit 409 writes the priority levels of each of the terminal apparatuses 103 into a setting register of the memory controller 311#0 and thereby, controls the operation of the memory controller 311#0. Similarly, the control unit 414 controls the memory controller 311#1 according to the priority level of the access right received by the receiving unit 412.

The managing units 410 and 411 each have a function of managing the virtual shared memory 104. For example, the managing unit 410 converts the access of the virtual shared memory 104 by the thread 0 into access to the shared memory 422#0 or 422#1 to be the real memory corresponding to the virtual shared memory 104. When access is converted into access to the shared memory 422#1, the managing unit 410 notifies the terminal apparatus 103#1 through the I/F 308#0 of the access request.

The receiving unit 412 has a function of receiving the priority level of the access right. For example, the receiving unit 412 receives the access right priority level information 423 from the terminal apparatus 103#0 and also receives the assignment request for the threads. The received access right priority level information 423 and the received information concerning the assignment request for the threads are stored to a storage area such as the register, the cache memory, or the RAM 303 of the CPU 301#1.

Figure 5:
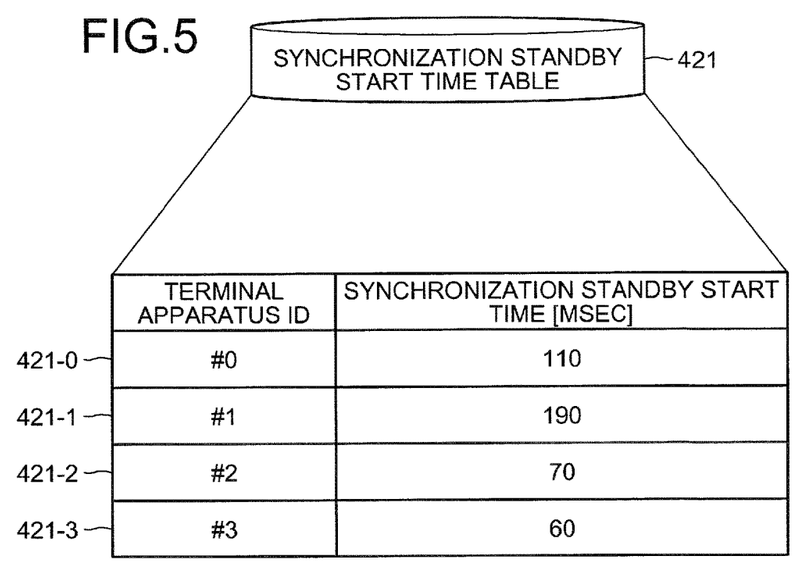
FIG. 5 is an explanatory diagram of an example of the contents of a synchronization standby start time table 421.

FIG. 5 is an explanatory diagram of an example of the contents of the synchronization standby start time table 421.

The synchronization standby start time table 421 includes two fields for the terminal apparatus identification (ID) and the synchronization standby start time. The terminal apparatus ID field stores identification information concerning the terminal apparatuses 103#0 to 103#3. The synchronization standby start time field stores the times at which the terminal apparatuses 103#0 to 103#3 start standing by for synchronization.

For example, the synchronization standby start time table 421 depicted in FIG. 5 includes records 421-0 to 421-3. In FIG. 5, it is assumed that the time is zero [msec] at which the execution of a thread associated with synchronous processing is started. In this case, the records 421-0 to 421-3 respectively indicate that the synchronization standby start time of the terminal apparatus 103#0 is 110 [msec]; that the synchronization standby start time of the terminal apparatus 103#1 is 190 [msec]; that the synchronization standby start time of the terminal apparatus 103#2 is 70 [msec]; and that the synchronization standby start time of the terminal apparatus 103#3 is 60 [msec].

Figure 6:
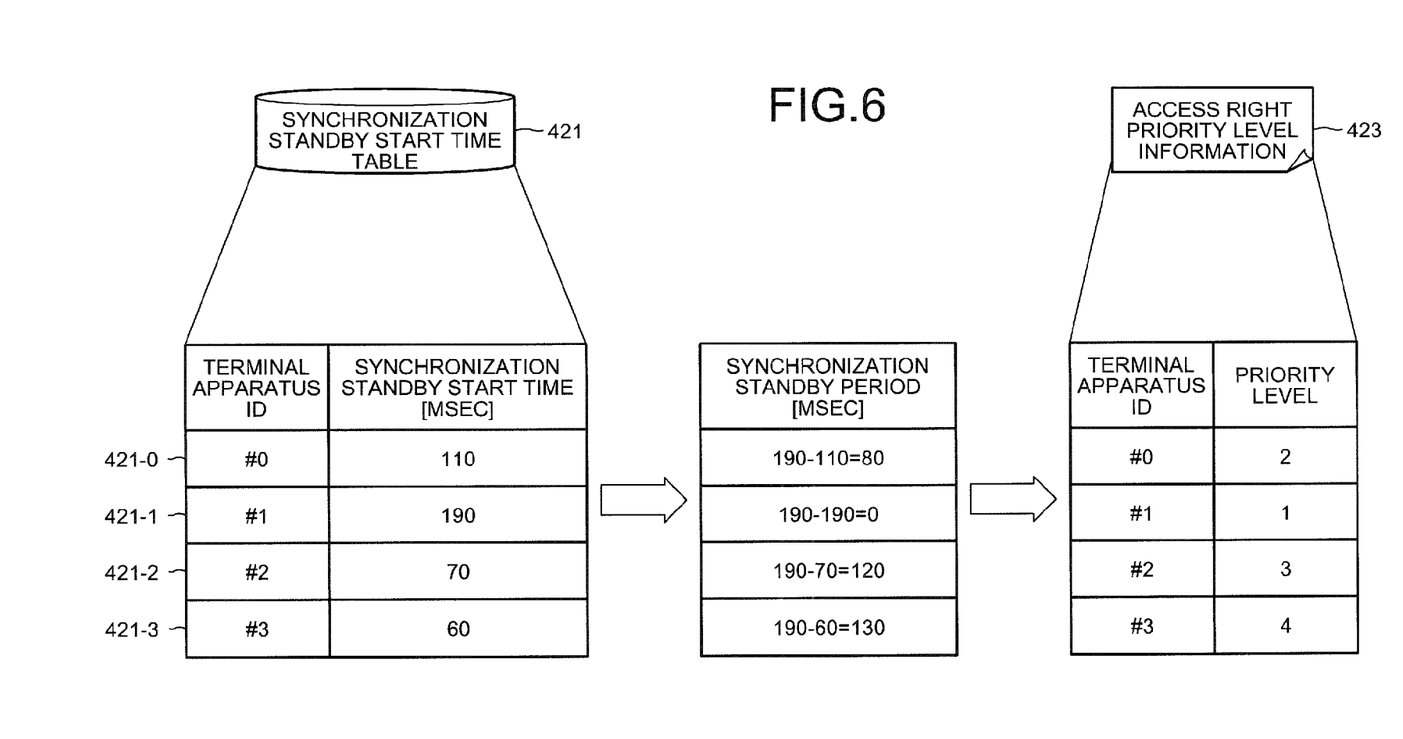
FIG. 6 is an explanatory diagram of an example of production of access right priority level information 423.

FIG. 6 is an explanatory diagram of an example of production of the access right priority level information 423. When the master terminal apparatus producing the access right priority level information 423 receives the execution results from all the terminal apparatuses 103 executing the threads that execute the synchronous processing, the master terminal apparatus calculates the synchronization standby period. The master terminal apparatus may also execute the thread that executes the synchronous processing. In this case, the timing at which the calculation of the synchronization standby period is started is the timing at which the execution of the thread by the master terminal apparatus comes to an end and the thread of the other thread by the slave terminal apparatus also comes to an end. The master terminal apparatus calculates the synchronization standby period using Eq. (1) below.

$$\text{synchronization standby period} = \text{synchronization standby start time of terminal apparatus from which execution results are received last} - \text{synchronization standby start time of terminal apparatus} \quad (1)$$

For example, the master terminal apparatus identifies from the synchronization standby start time fields of the records 421-0 to 421-3, the terminal apparatus 103#1 as the terminal apparatus from which execution results are received last; and calculates the synchronization standby period of the terminal apparatus 103#0 from Eq. (1).

synchronization standby period of terminal apparatus 103#0=190−110=80 [msec]

The master terminal apparatus also calculates the synchronization standby periods of the terminal apparatuses 103#1 to 103#3 respectively to be 0, 120, and 130 [msec]. After the calculation, the master terminal apparatus sets the priority levels of the access rights to access the virtual shared memory 104 in ascending order of the length of the synchronization standby period. The set priority levels of the access rights are produced as the access right priority level information 423.

The access right priority level information 423 includes two fields for the terminal apparatus ID and the priority level. The terminal apparatus ID field stores identification information concerning the terminal apparatuses 103#0 to 103#3. The priority level field stores the priority levels of the access rights to access the virtual shared memory 104. The priority levels depicted in FIG. 6 are defined such that "1" indicates the highest priority level, and the priority level decreases as the numerical value thereof increases.

The master terminal apparatus sets the priority level of the terminal apparatus 103#1 whose synchronization standby period is the shortest, to be "1"; and sets the priority levels of the terminal apparatuses 103#0, 103#2, and 103#3 to respectively be "2", "3", and "4" in ascending order of the length of the synchronization standby period.

Figure 7:
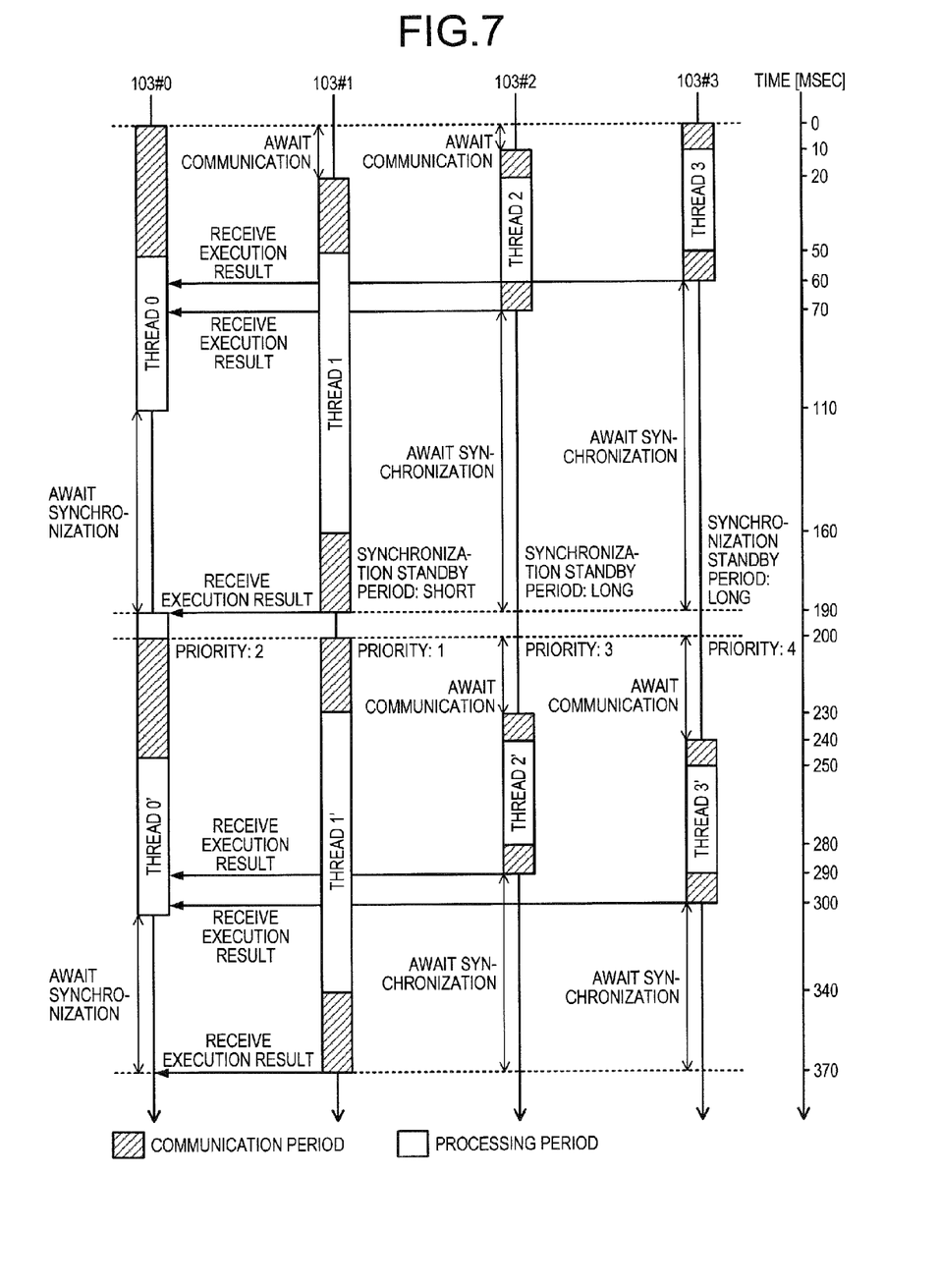
FIG. 7 is an explanatory diagram of an example of operation of the thread processing system 100 executed when the access right priority level information is set.

FIG. 7 is an explanatory diagram of an example of operation of the thread processing system 100 executed when the access right priority level information is set. The thread processing system 100 depicted in FIG. 7 executes the threads 0 to 3 from the time point zero [msec] and also executes threads 0' to 3' at 200 [msec]. In this case, it is assumed that the processing volumes of the threads 0 to 3 are equal to those of the threads 0' to 3'.

In the thread processing system 100 from zero to 190 [msec], no priority level of any access right is set to access the virtual shared memory 104. In the thread processing system 100 from 190 to 200 [msec], a process of setting the priority level of the access right to access the virtual shared memory 104 is executed. In the thread processing system 100 from 200 to 370 [msec], the priority level of the access right is set to access the virtual shared memory 104.

It is assumed that the terminal apparatus 103#0 acting as the master terminal apparatus communicates with the terminal apparatuses 103#1 to 103#3 acting as the slave terminal apparatuses and no communication is executed among the terminal apparatuses 103#1 to 103#3. Therefore, the terminal apparatus 103#0 executes high speed communication with the terminal apparatuses 103#2 and 103#3 and executes low speed communication with the terminal apparatus 103#1.

As to the execution time periods of the threads 0 to 3 and communication time periods generated by the execution of the threads, it is assumed in FIG. 7 that the processing time periods of the threads 0, 1, 2, and 3 executed respectively by the terminal apparatuses 103#0, 103#1, 103#2, and 103#3 respectively are 60, 110, 40, and 40 [msec].

It is also assumed that the communication time period between the terminal apparatuses 103#0 and 103#1 whose communication is the low speed communication is 30 [msec] and that the communication time periods between the terminal apparatuses 103#0 and 103#2 and between those 103#0 and 103#3 whose communication is the high speed communication are 10 and 10 [msec].

In this state, at the time point zero [msec], the terminal apparatus 103#0 assigns the threads 0 to 3 respectively to the terminal apparatuses 103#0 to 103#3. The terminal apparatuses 103#0 to 103#3 assigned with the threads access the virtual shared memory 104 to execute the threads. It is assumed that the shared memory 422 corresponding to the virtual shared memory 104 accessed in this case is the shared memory 422#0. Therefore, the terminal apparatuses 103#1 to 103#3 communicate with the terminal apparatus 103#0. In this case, the terminal apparatus 103#3 that performs high speed communication and successfully starts the communication first communicates with the terminal apparatus 103#0.

When the communication between the terminal apparatuses 103#0 and 103#3 comes to an end at a time 10 [msec], the terminal apparatuses 103#0 and 103#2 start communication therebetween. The terminal apparatus 103#3 whose communication comes to an end, executes the thread 3. When the communication between the terminal apparatuses 103#0 and 103#2 comes to an end at a time 20 [msec], the terminal apparatuses 103#0 and 103#1 start communication therebetween. The terminal apparatus 103#3 whose communication comes to an end, executes the thread 2. When the communication between the terminal apparatuses 103#0 and 103#1 comes to an end at a time 50 [msec], the terminal apparatuses 103#0 and 103#1 respectively execute the threads 0 and 1.

The terminal apparatus 103#3 completes the execution of the thread 3 at the time 50 [msec] after 40 [msec] elapses from the time point 10 [msec] and notifies the terminal apparatus 103#0 of the execution result at a time 60 [msec]. The terminal apparatus 103#0 receives the execution result and registers the synchronization standby start time of the terminal apparatus 103#3 into the synchronization standby start time table 421 as 60 [msec]. Similarly, at a time 70 [msec], the terminal apparatus 103#2 completes the execution of the thread 2 and notifies the terminal apparatus 103#0 of the execution result. The terminal apparatus 103#0 receives the notification, receives the execution result, and registers the synchronization standby start time of the terminal apparatus 103#2 into the synchronization standby start time table 421 as 70 [msec].

When the terminal apparatus 103#0 completes the execution of the thread 0 at a time 110 [msec], the terminal apparatus 103#0 registers the synchronization standby start time of the terminal apparatus 103#0 into the synchronization standby start time table 421 as 110 [msec]. The terminal apparatus 103#1 completes the execution of the thread 1 at a time 160 [msec] and notifies the terminal apparatus 103#0 of the execution result at a time 190 [msec]. The terminal apparatus 103#0 registers the synchronization standby start time of the terminal apparatus 103#1 into the synchronization standby start time table 421 as 190 [msec]. Because all the terminal apparatuses 103 complete the execution of the threads, the master terminal apparatus starts execution of the next process.

At the time 190 [msec], the terminal apparatus 103#0 calculates the synchronization standby periods of the terminal apparatuses 103. The synchronization standby periods of the terminal apparatuses 103#0 to 103#3 are respectively calculated to be 80, zero, 120, and 130 [msec]. From the calculation result, the terminal apparatus 103#0 sets the priority levels of the access rights of the terminal apparatuses 103#0 to 103#3 to access the virtual shared memory 104 to respectively be "2", "1", "3", and "4".

When the priority levels are set, at a time 200 [msec], the terminal apparatus 103#0 assigns the threads 0' to 3' to the terminal apparatuses 103#1 to 103#3. The terminal apparatuses 103#1 to 103#3 assigned with the threads, access the virtual shared memory 104 to execute the threads. The terminal apparatuses 103#1 to 103#3 communicate with the terminal apparatus 103#0.

In this case, initially, the terminal apparatus 103#3 that performs high speed communication and successfully starts the communication soonest communicates with the terminal apparatus 103#0. However, thereafter, when the terminal apparatus 103#0 receives an access request from the terminal apparatus 103#1 whose priority level is high, the terminal apparatus 103#0 temporarily discontinues the access of the shared memory 422#0 by the terminal apparatus 103#3 and executes access of the shared memory 422#0 by the terminal apparatus 103#1. When the communication between the terminal apparatuses 103#0 and 103#1 comes to an end at a time 230 [msec], the terminal apparatus 103#2 whose priority level is the second highest starts communication with the terminal apparatus 103#0. When the communication between the terminal apparatuses 103#0 and 103#2 comes to an end at a time 240 [msec], the terminal apparatus 103#3 whose priority level is the third next highest starts communication with the terminal apparatus 103#0.

The terminal apparatuses 103 execute the threads 0' to 3' assigned thereto sequentially from the terminal apparatus 103 whose communication comes to an end. At a time 290 [msec], the terminal apparatus 103#2 notifies of the execution result of the thread 2' and the terminal apparatus 103#0 receives the execution result of the thread 2'. Similarly, at a time 300 [msec], the terminal apparatus 103#3 notifies of the execution result of the thread 3' and the terminal apparatus 103#0 receives the execution result of the thread 3'. At a time 370 [msec], the terminal apparatus 103#1 notifies of the execution result of the thread 1' and the terminal apparatus 103#0 receives the execution result of the thread 1'.

As described, in the thread processing system 100, the priority levels of the access rights to access the virtual shared memory 104 are set and thereby, the process that is executed by the terminal apparatus 103#1 and that is a bottleneck can be completed quickly. Thus, the processing performance of the thread processing system 100 can be improved. For example, in FIG. 7, if the thread processing system 100 has no priority level of the access right set to access the virtual shared memory 104, a time period of 190 [msec] elapses until all the threads come to an end. In the thread processing system 100 having the priority levels of the access rights set to access the virtual shared memory 104, 170 [msec] elapses until all the threads come to an end. Therefore, the processing performance can be improved.

Figure 8:
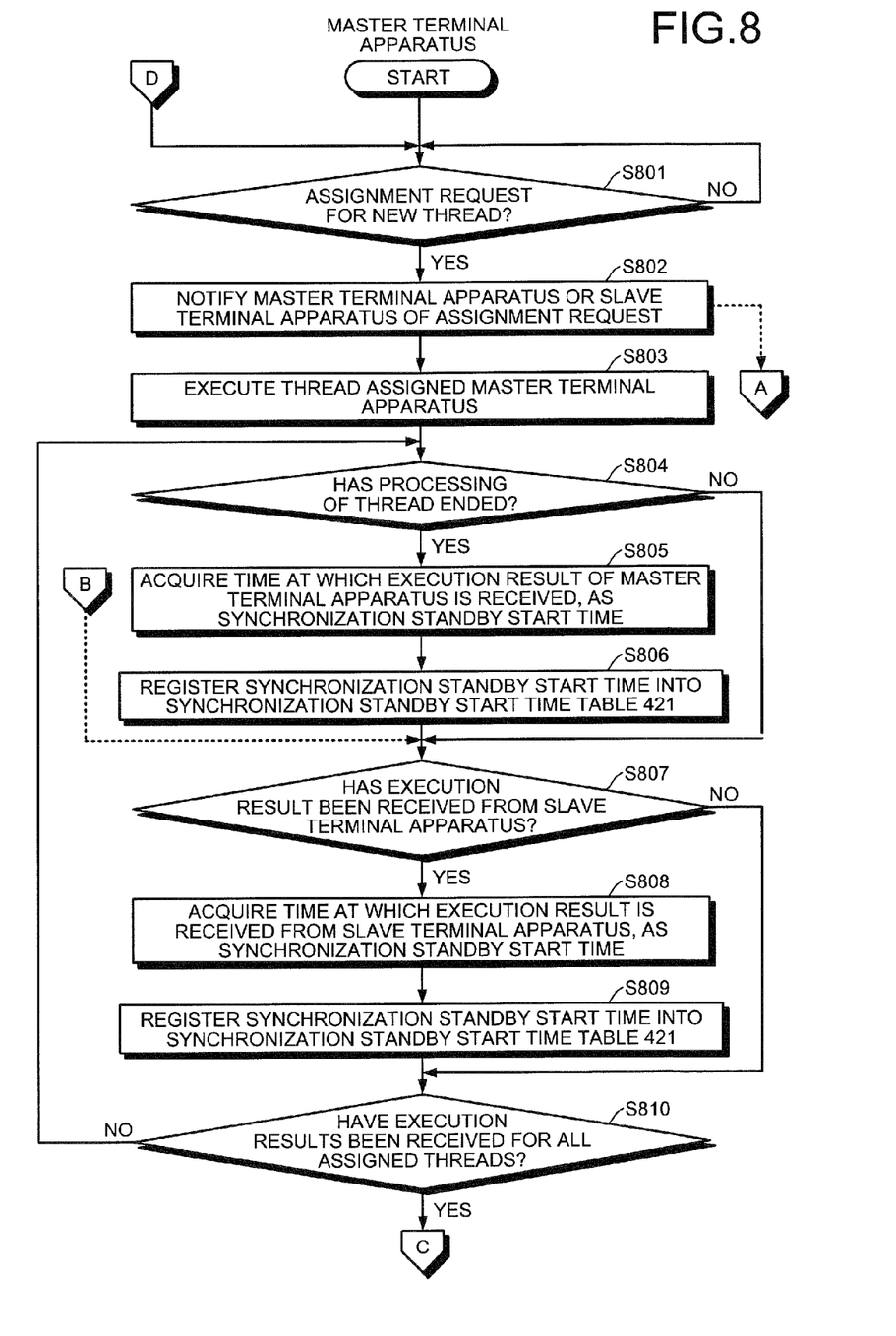
FIG. 8 is a flowchart (Part I) of an example of a process procedure executed when a thread is executed by the master terminal apparatus.
Figure 9:
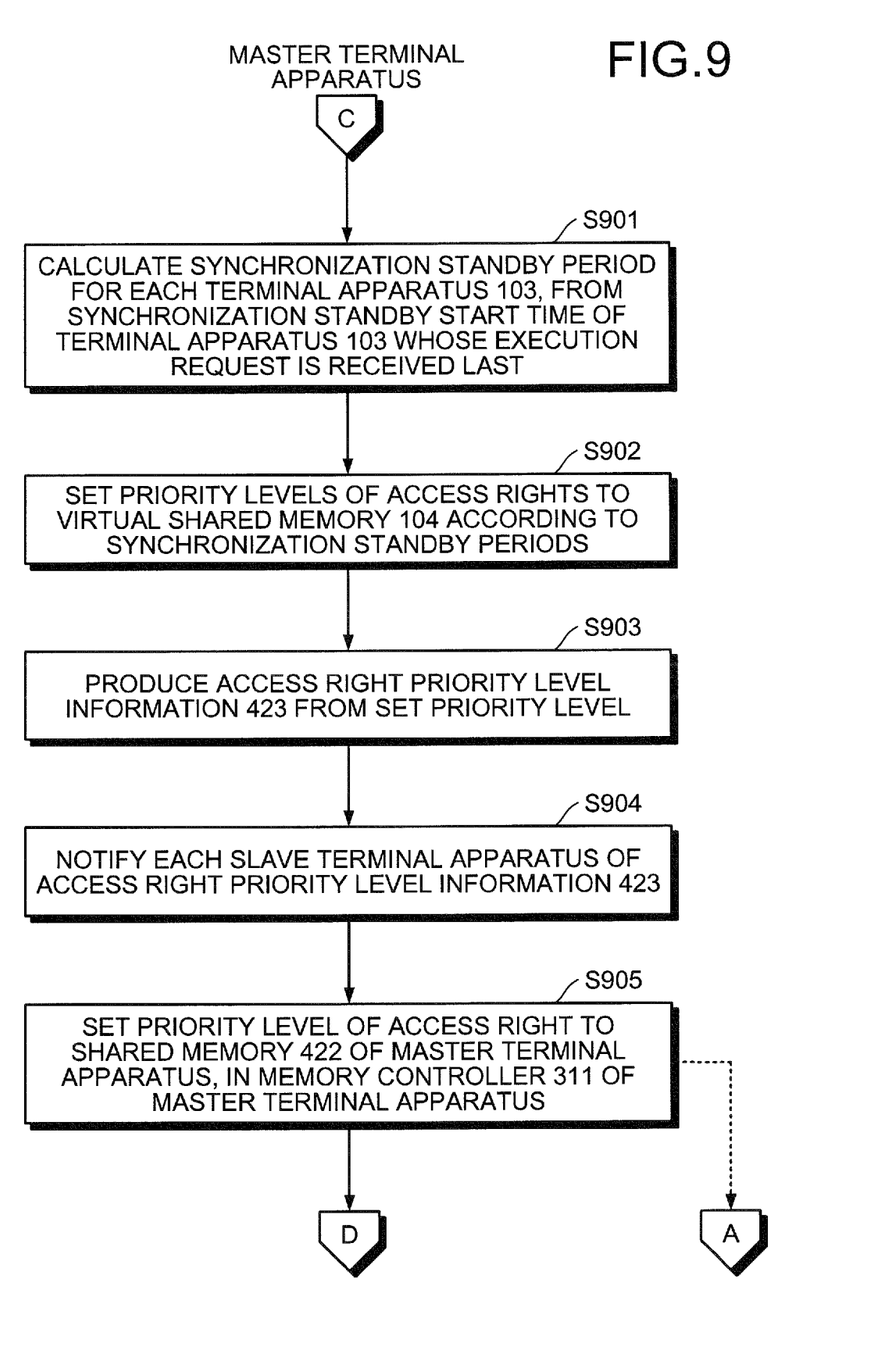
FIG. 9 is a flowchart (Part II) of an example of the process procedure executed when a thread is executed by the master terminal apparatus.
Figure 10:
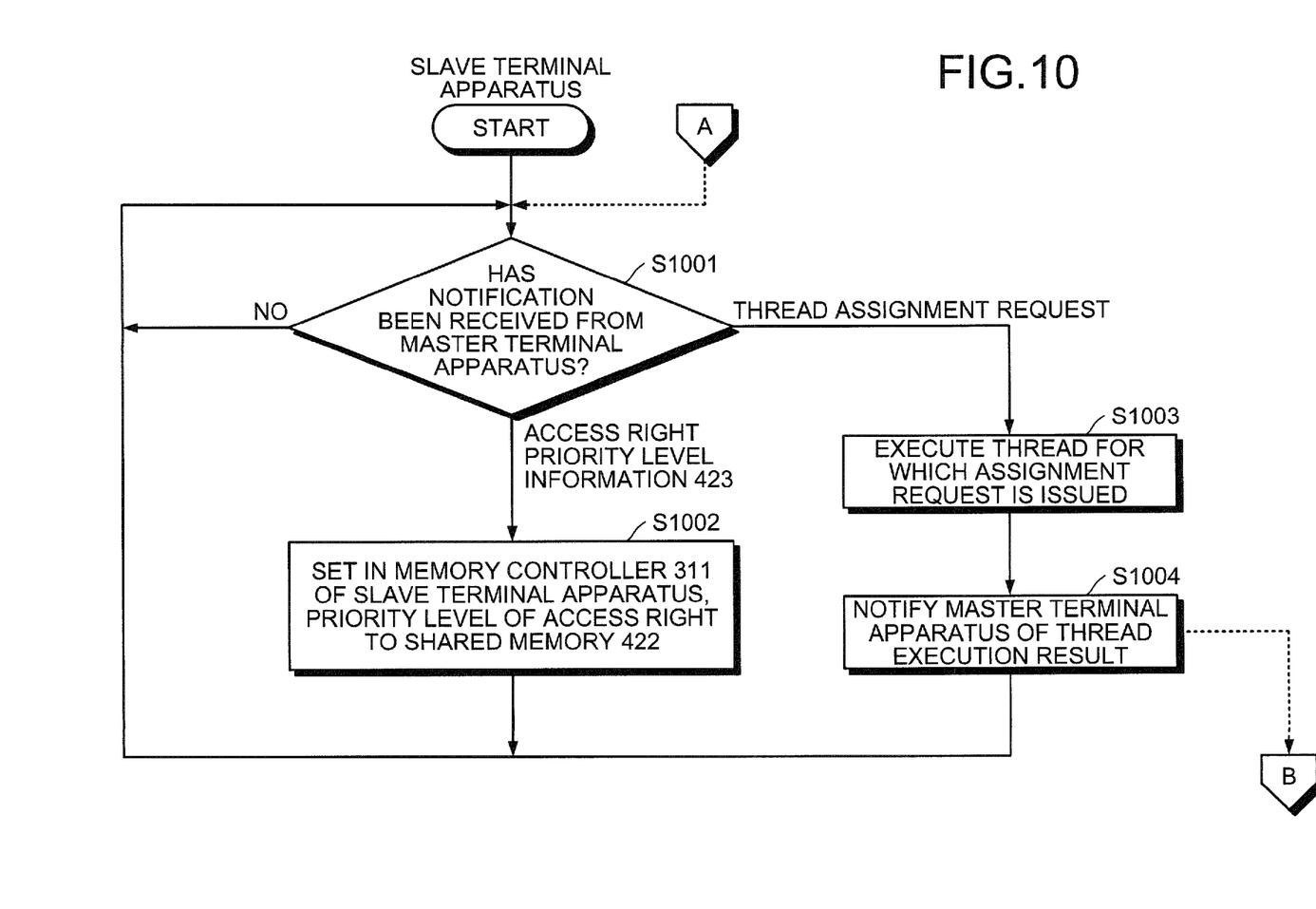
FIG. 10 is a flowchart of an example of a process procedure executed when a thread is executed by the slave terminal apparatus.

FIGS. 8 to 10 depict a flowchart of an example of a process procedure to execute the operations depicted in FIG. 7 executed when threads are executed. FIGS. 8 and 9 depict a process procedure executed when a thread is executed by the master terminal apparatus. FIG. 10 depicts a process procedure executed when threads are executed by the slave terminal apparatuses that operate in response to a notification from the master terminal apparatus.

FIG. 8 is a flowchart (Part I) of an example of the process procedure executed when a thread is executed by the master terminal apparatus. The master terminal apparatus determines whether any assignment request for a new thread has occurred (step S801). If the master terminal apparatus determines that no assignment request for a new thread occurs (step S801: NO), the master terminal apparatus again executes the operation at step S801 after a predetermined time period elapses.

If the master terminal apparatus determines that an assignment request for a new thread has occurred (step S801: YES), the master terminal apparatus notifies the master terminal apparatus or the slave terminal apparatus of the assignment request for a new thread (step S802). If plural new thread requests occur, the master terminal apparatus executes the operation at step S802 plural times. The process of determining whether the new thread is to be assigned to the master terminal apparatus or a slave terminal apparatus is a function of the scheduler. For example, the scheduler may assign the new thread to the terminal apparatus whose load is the lowest, among the master and the slave terminal apparatuses. After the assignment of the thread, the master terminal apparatus executes a thread assigned thereto (step S803).

The master terminal apparatus determines whether the processing of the thread assigned thereto has ended (step S804). If the master terminal apparatus determines that the processing of the thread has ended (step S804: YES), the master terminal apparatus acquires the time at which the execution result of the master terminal apparatus is received, as the synchronization standby start time (step S805). After the acquisition, the master terminal apparatus registers the acquired synchronization standby start time into the synchronization standby start time table 421 (step S806). After the storage or if the master terminal apparatus determines that the processing of the thread has not ended (step S804: NO), the master terminal apparatus determines whether the master terminal apparatus has received an execution result from a slave terminal apparatus (step S807). The execution result of the slave terminal apparatus is notified of by the operation at step S1004 described later.

If the master terminal apparatus determines that the master terminal apparatus has received an execution result (step S807: YES), the master terminal apparatus acquires the time at which the master terminal apparatus received the execution result from the slave terminal apparatus, as the synchronization standby start time (step S808). After the acquisition, the master terminal apparatus registers the acquired synchronization standby start time into the synchronization standby start time table 421 (step S809). After the storage or if the master terminal apparatus determines that the master terminal apparatus has not received an execution result (step S807: NO), the master terminal apparatus determines whether the master terminal apparatus has received execution results for all assigned threads (step S810). If the master terminal apparatus determines that the master terminal apparatus has not received all the execution results (step S810: NO), the master terminal apparatus proceeds to the operation at step S804. If the master terminal apparatus determines that the master terminal apparatus has received all the execution results (step S810: YES), the master terminal apparatus proceeds to the operation at step S901.

FIG. 9 is a flowchart (Part II) of an example of the process procedure executed when a thread is executed by the master terminal apparatus. After executing the operation at step S810, the master terminal apparatus calculates the synchronization standby period for each of the terminal apparatuses 103 from the synchronization standby start time of the terminal apparatus 103 whose execution request is received last (step S901). After the calculation, the master terminal apparatus sets the priority levels of the access rights to access the virtual shared memory 104 according to the synchronization standby periods of the terminal apparatuses 103 (step S902).

The master terminal apparatus produces the access right priority level information 423 from the set priority level (step S903) and notifies each slave terminal apparatus of the access right priority level information 423 (step S904). After the notification, the master terminal apparatus sets the priority level of the access right to access the shared memory 422 of the master terminal apparatus, in the memory controller 311 of the master terminal apparatus (step S905) and proceeds to the operation at step S801.

FIG. 10 is a flowchart of an example of the process procedure executed when a thread is executed by the slave terminal apparatus. The slave terminal apparatus checks whether the slave terminal apparatus has received notification from the master terminal apparatus (step S1001). Notification from the master terminal apparatus is given by the operations at steps S802 and S905. If the slave terminal apparatus determines that the slave terminal apparatus has not received notification from the master terminal apparatus (step S1001: NO), the slave terminal apparatus proceeds to the operation at step S1001 after a predetermined time period elapses.

If the slave terminal apparatus determines that the slave terminal apparatus has received notification of the access right priority level information 423 to access the virtual shared memory 104 (step S1001: ACCESS RIGHT PRIORITY LEVEL INFORMATION 423), the slave terminal apparatus sets in the memory controller 311 of the slave terminal apparatus, the priority level of the access right to access the shared memory 422 (step S1002). After the setting, the slave terminal apparatus proceeds to the operation at step S1001.

If the slave terminal apparatus determines that the slave terminal apparatus has received notification about the thread assignment request (step S1001: THREAD ASSIGNMENT REQUEST), the slave terminal apparatus executes the thread for which the assignment request is issued (step S1003). After the execution comes to an end, the slave terminal apparatus notifies the master terminal apparatus of the execution result of the thread and proceeds to the operation at step S1001.

As described, according to the thread processing method and the thread processing system, when the plural terminal apparatuses execute the synchronous processing, the priority level of the access right is set to be high for access of the shared memory by a low-processing performance terminal apparatus that causes the other terminal apparatuses to stand by for a long time. Thus, the execution time period of the low-processing performance terminal apparatus is reduced and the synchronization standby period of each of the other terminal apparatus is reduced, whereby the overall processing performance of the thread processing system can be improved.

A method of providing redundant data is present as another technique to improve the overall processing performance. The frequency of accessing the other terminal apparatuses is reduced and therefore, the processing performance can be improved. However, even in the case where the redundant data is provided, if synchronous processing frequently occurs, the overall processing performance drops. According to the thread processing system of the present embodiment, the synchronization standby period is reduced as much as possible and therefore, the overall processing performance can be improved.

With the method of provided the redundant data, a problem arises in that the amount of the memory used becomes large. A terminal apparatus such as a portable telephone to which the present embodiment is applicable has limited memory capacity and therefore, it is difficult to apply the technique of using redundant data, which consumes a large amount of memory. According to the thread processing system of the present embodiment, the data do not need to be redundantly provided and therefore, the memory capacity can be reduced and the system is applicable to the terminal apparatus.

According to the thread processing system, the master terminal apparatus may notify the slave terminal apparatus of the priority level of the access right to access the shared memory. Thereby, all the terminal apparatuses can operate the virtual distributed shared memories whose priority levels are controlled.

According to the thread processing system, the synchronization standby period of each of the terminal apparatuses may be calculated from the first time information, which indicates the time at which the execution results of the plural threads are received, and the second time information, which indicates the time at which the reception of the execution results of the plural threads comes to an end, and the priority level may be set based on the synchronization standby period. The calculation of the synchronization standby periods enables the thread processing system to detect the terminal apparatus that causes a bottleneck.

The terminal apparatus that causes a bottleneck may be a low-processing performance terminal apparatus or may be a terminal apparatus executing low-speed communication. However, according to the thread processing system according to the present embodiment, the terminal apparatus that causes a bottleneck can be detected based on the time at which the execution result is received without obtaining the processing performance or the communication speed of the terminal. Therefore, according to the thread processing system of the present embodiment, no new information is to be communicated among the terminals except the priority level information of the shared memory.

According to the thread processing system, the priority level of the access right to access the shared memory may be set to be high when the synchronization standby period is short. Thereby, in the thread processing system, the priority level of the terminal apparatus that causes a bottleneck and whose synchronization standby period is short may be set to be high. Consequently, the overall processing performance can be improved.

The thread processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to an aspect of the embodiments, drops in the overall performance of the system can be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A thread processing method executed by a specific apparatus, the method comprising:
    assigning a plurality of threads to a plurality of apparatuses, wherein the plurality of threads are controlled to be synchronized with each other by the plurality of apparatuses and each of the plurality of threads executes processing to access a shared memory shared by the specific apparatus and the plurality of apparatuses;
    acquiring, for each of the plurality of apparatuses, first time information that indicates a time at which the specific apparatus receives an execution result of a thread assigned to the apparatus;
    calculating, for each of the plurality of apparatuses, a synchronization standby period during which the apparatus is in a synchronization-standby mode and that is a difference between the time indicated by the first time information and a time that is indicated by second time information and at which the specific apparatus receives a last execution result among execution results of threads that are assigned to the plurality of apparatuses; and
    setting, in an ascending order of the synchronization standby period, a priority level of an access right for each of the plurality of apparatuses to access the shared memory when executing a new thread that executes the processing to access the shared memory.

2. The thread processing method according to claim 1, further comprising
    notifying the plurality of apparatuses of information concerning the priority level of the access right to access the shared memory.

3. The thread processing method according to claim 1, wherein
    the setting includes setting the priority level of the access right to access the shared memory such that a shorter synchronization standby period corresponds to a higher priority level.

4. A thread processing system, comprising:
    a specific apparatus and a plurality of other apparatuses, wherein
    the specific apparatus is configured to:
    assign a plurality of threads to the other apparatuses, wherein the plurality of threads are controlled to be synchronized with each other by the plurality of other apparatuses and each of the plurality of threads executes processing to access a shared memory shared by the specific apparatus and the plurality of other apparatuses;
    acquire, for each of the plurality of other apparatuses, first time information that indicates a time at which the specific apparatus receives an execution result of a thread assigned to the respective other apparatus;
    calculate, for each of the plurality of apparatuses, a synchronization standby period during which the apparatus is in a synchronization-standby mode and that is a difference between the time indicated by the first time information and a time that is indicated by second time information and at which the specific apparatus receives a last execution result among execution results of threads that are assigned to the plurality of apparatuses; and
    set, in an ascending order of the synchronization standby period, a priority level of an access right for each of the plurality of other apparatuses to access the shared memory when executing a new thread that executes the processing to access the shared memory.

5. The thread processing system according to claim 4, wherein
    the specific apparatus is configured to notify the plurality of other apparatuses of information concerning the priority level of the access right to access the shared memory.

6. The thread processing system according to claim 4, wherein
    each of the plurality of other apparatuses is configured to control a memory controller that controls access of the shared memory, according to the priority level of the access right to the shared memory.

* * * * *